United States Patent [19]

Scharrer

[11] 4,300,702
[45] Nov. 17, 1981

[54] SEALING CAP

[76] Inventor: Konrad Scharrer, 12, Ulrish-V-Hassel-Strasse, 4019 Monheim, Fed. Rep. of Germany

[21] Appl. No.: 144,007

[22] Filed: Apr. 28, 1980

[30] Foreign Application Priority Data

Apr. 27, 1979 [DE] Fed. Rep. of Germany ....... 2917150

[51] Int. Cl.³ .................... B65D 41/06; B65D 41/36
[52] U.S. Cl. ................................. 220/295; 220/293; 220/DIG. 33
[58] Field of Search ............ 220/94 A, 293, 295, 220/DIG. 32, DIG. 33

[56] References Cited

U.S. PATENT DOCUMENTS

| 4,020,970 | 5/1977 | Koscik | 220/295 X |
| 4,081,102 | 3/1978 | Sakai | 220/295 X |
| 4,190,155 | 2/1980 | Higley | 220/94 A X |

FOREIGN PATENT DOCUMENTS

| 1939413 | 3/1956 | Fed. Rep. of Germany . |
| 1909257 | 8/1964 | Fed. Rep. of Germany . |
| 7125810 | 7/1971 | Fed. Rep. of Germany . |
| 1515873 | 7/1966 | France . |

*Primary Examiner*—George T. Hall
*Attorney, Agent, or Firm*—William A. Drucker

[57] ABSTRACT

A sealing cap has an external cover section of external diameter greater than a circular sealing face about an opening. An internal cover projects into the opening, and a tightener is provided. A diametral handle is molded on the external cover section and has a U-shaped stirrup with two legs connecting it to the external cover section, and a wall extending along the center of the stirrup and connecting it to the external cover section. The improvement of the invention is that each cover section is made as a one-piece molding, and the legs of the stirrup are spaced by not less than the external diameter of the cover section sealing face, and the length of the wall, longitudinally of the stirrup, is less than the internal diameter of the cover sealing face.

4 Claims, 2 Drawing Figures

SEALING CAP

The invention relates to a sealing cap according to the preamble of claim 1.

Such a sealing cap is known (DE-GM No. 71 25 810). In this the external cover section consists of sheet metal, the handle is pressed out of the sheet metal and is drawn in laterally, to form the externally located, U-shaped stirrup whilst forming the wall which joins the stirrup to the rest of the cover section, and the internal cover section, manufactured as a casting, is in the shape of a cup with a circular flange adjacent to the external cover section, on the outer periphery of which the external cover section is attached and on the back of which the cover-side sealing face is formed. The drawn in area of the handle, which as a wall connects the thus formed stirrup with the external cover section, is severely rounded at its radial outer ends, so that both the legs of the stirrup spread out sharply towards the external cover section and, with their point of connection to the external cover section, lie in a radial area which is axially adjacent to the cover-side sealing face. To reduce the internal volume of the cap which is accessible to the container contents or to a liquid which might escape from the pipe connection, a sealing ring and a sealing plate are located between the inner cover section and the external cover section. Sealing ring and sealing plate, as well as the design of the sealing cap in two sections consequently postulate a high manufacturing outlay.

For easier manufacture, there is a general trend, also for sealing caps, to produce from plastic in a single casting operation what have hitherto been multiple section devices consisting of e.g. plastic castings as well as metallic mouldings. This is not however possible with the above quoted known sealing cap. If in this case one wanted to produce the external and the internal cover section as one piece and to form the cover-side sealing face on the back of the external cover section, the handle crossing the area of this sealing face on the outside of the external cover section would have the effect that the sealing face would deform during the cooling of the cast sealing cap in its sections located axially opposite the handle, since practically every available material is subjected to dimensional changes when cooling after casting-even though slightly. Consequently the flatness of the cover-side sealing face required for reliable sealing would no longer be produced. Even if this flatness could be achieved by using particularly high quality materials, by employing particularly expensive casting processes and/or by expensive afterprocessing, it would nevertheless be lost again during the course of the sealing cap's useful service life. The fluctuations in pressure and temperature acting on it would again result in shape changes in sections axially adjacent to the handle, on account of the run of the handle across the area of the cover-side sealing face, since the materials available, and in particular plastics, do not fully exhibit shape constancy with such effects. These disadvantages are to be especially feared for employment under difficult conditions in respect of pressure and temperature changes, which is the case for instance in motor vehicles, where sealing caps used to seal oil connecting pipes are frequently subjected to severe temperature changes as a result of the engine heating up.

A further sealing cap is known (DE-GM No. 19 39 413) which incorporates an external cover section, an internal cover section which projects from the former into the opening to be sealed and which is provided with a peripheral sealing lip, and a plug-shaped appendage provided on the outside of the external cover section for removing the sealing cap from a sealed pipe connection. The external cover section and the internal cover section are fashioned in one piece, and a circular bearing surface is formed on the back of the external cover section radially outside the internal cover section, with which the sealing cap rests on the free end of the pipe connection to be sealed. The plug-shaped appendage on the outside of the external cover section is located eccentrically to the latter's centre, but radially within its circular area in which the above mentioned bearing surface on the back of the external cover section is formed. A handle which is larger than the plug-shaped appendage mentioned and which extends beyond the outside of the external cover section is not therefore necessary for the known sealing cap, because the latter has no seals working together with further seals provided on the internal periphary of the pipe connection opening and which require the sealing cap to be turned.

Sealing caps are also known which can be employed in particular for sealing tanks or pipe connections in a motor vehicle and which are provided with seals which work together with further seals provided on the internal periphery and which require the cap to be turned (FR-PS No. 15 15 873, DE-GM No. 19 08 257), external cover section and internal cover section being fashioned in one piece with a cover-side sealing face located on the back of the external cover section. Here however no handle extending beyond the external cover section is provided, but the external cover section is designed as a cap, to be gripped and turned manually. In many cases of application however there is insufficient space radially outside the sealing cap to be able to grip and turn the sealing cap manually.

The basic object of the invention is to develop a sealing cap of the type mentioned at the beginning in such a way that it can be made of plastic by a simple method, that, despite this, in practice no impairment of the shape constancy of the cover-side sealing face occurs during manufacture and throughout a long useful service life, and that easy manipulation by means of the handle is possible.

The task is resolved according to the invention with a sealing cap of the type mentioned at the beginning by means of the features quoted in the characterising section of claim 1.

In the sealing cap according to the invention the internal cover section, external cover section and handle are combined in one piece and are manufactured from plastic in a single casting operation. The U-shaped stirrup, made of solid material and provided as part of the handle, engages with its legs in the external cover section radially outside the area of the cover-side sealing face which is located on the back of the external cover section, so that forces transmitted from the stirrup to the external cover section, as they will occur after a casting operation and in service, will only act on the outer edge of the external cover section, without impairing the shape constancy of cover-side sealing face. In addition, as a result of the stirrup shape of the handle which extends to the outer periphery of the external cover section, an ergonomically favorable configuration is obtained.

The invention is explained below with reference to the drawings in which a sample embodiment is shown.

Figure 1:
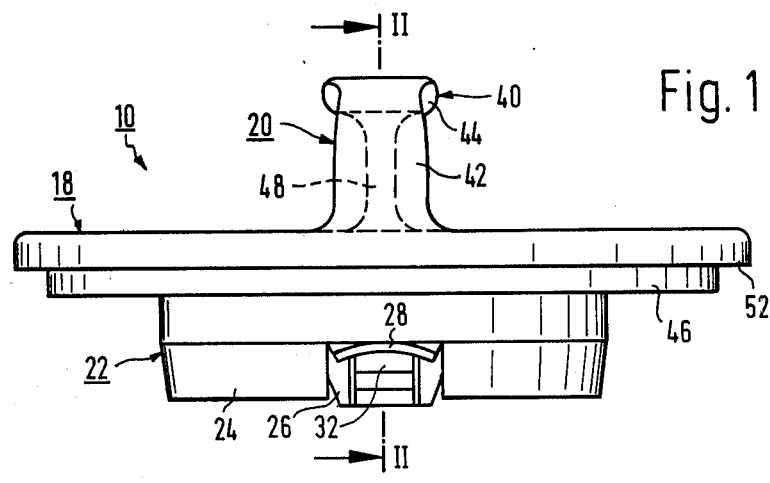
FIG. 1 shows a sealing cap according to the invention in side elevation.

The sealing cap 10 shown in the figures serves to seal the oil filling connection 12 of a motor vehicle which at its free end is flanged and has a permanent sealing face 16 encompassing the circular opening 14 thus formed. The sealing cap has an external cover section 18 which covers the opening 14 and the permanent sealing face 16, a handle 20 attached to the former's outside in one piece, and an internal cover section 22 which projects from the external cover section 18 into the opening 14. The internal cover section 22 in the sample embodiment is fashioned from an essentially hollow cylindrical wall 24 and a hollow plug 26 located within the former and projecting axially from the external cover section 18. The external diameter of the wall 24 matches the internal diameter of the opening 14, and the wall 24 and is tapered externally towards its rearward end, so that it will serve to guide the sealing cap 10 when it is placed on the end of the oil filler pipe 12. The plug 26 passes through a leaf spring 28 which, with its ends convexly curved towards the external cover section 18, projects on both sides from recesses 30 of the wall 24 beyond the latter's external diameter, and, if the sealing cap 10 is not firmly fitted (FIG. 1), the leaf spring 28 is pretensioned by means of the latch stops 32 formed on the plug 26 against the bottom of the recesses 30 and consequently continues to be restrained against axial displacement of the external cover section 18. The leaf spring 28 acts, together with a curved guide 36 formed on the flanging 34 of the oil filling connection 12, in such a way that a twisting seal results.

On the back of the external cover section 18 facing the oil filling connection 12, is a circular cover-side sealing face 38 which faces the permanent sealing face 16 and which has as smooth as possible a surface. To prevent twisting, the radial width of the cover-side sealing face 38 is selected larger than the relatively small radial width of the permanent sealing face.

The handle 20 comprises a U-shaped stirrup 40 which extends diametrically beyond the outside of the external cover section 18 and the external dimensions of which equal the external diameter of the external cover section 18. The stirrup 40 consists of two legs 42 of mutually equal dimensions and a middle section 44 connecting the legs 42. The height of middle section 44, and consequently of the complete handle 40, measured axially or at right angles to the external cover section 18, is several times smaller than the external diameter of the external cover section 18. Both the legs 42 are connected to the external cover section 18 with their ends which are adjacent to the latter. The connecting points lie radially outside the latter, on the outside of the external cover section's 18 free circular area in which the cover-side sealing face 38 is formed on the back of the external cover section 18, since both the legs 42 have a mutual internal spacing equal to the external diameter of the cover-side sealing face 38. By this means, deforming dynamic effects transmitted by the legs 42 to the external cover section 18 will be practically without effect in the area of the cover-side sealing face 38.

On the cover-side sealing face 38 there is a sealing ring 46 which, when the sealing cap 10 is placed on the oil filling connection 12, comes to rest against the permanent sealing face 16 and is squeezed between the sealing faces 16 and 38. Although sealing alone by means of the sealing faces 16 and 38 lying together could be considered, by this means the sealing effect is further improved, and furthermore slight shape deviations in the permanent sealing face 38 which may occur will be compensated for by a precisely even shape of the sealing ring 46. Any configuration irregularities of the permanent sealing face 16 will also be accommodated by the sealing ring 46. To retain the sealing ring 46 when the sealing cap is removed 10, the sealing ring 46 fits held by friction, with its internal periphery on the outside of the wall 24 under slight pretension.

In the back of the external cover section 18 a peripheral groove 48 is formed which surrounds the wall 24 of the internal cover section 22 and which extends radially up to the internal periphery of the cover-side sealing face 38, receding opposite the cover-side sealing face 38. The sealing ring, with its very slightly thickened internal periphery due to the pretension, can escape into this groove. This ability to escape is furthermore particularly important because practically all sealing materials swell under the influence of the fluid to be sealed and because the oil to be sealed results in a corresponding thickening of the sealing ring 46. Finally, the groove 48 also produces a reduction in the thickness of the external cover section 18 which is smooth on its outside opposite that circular area in which the cover-side sealing face 38 is located, as a result of which forces exerted by the leaf spring 28 in the rest state, via the wall 24, on the external cover section 18 can less easily result in a shape change of the cover-side sealing face 38 than would be the case without the presence of the groove 48.

In the back of the external cover section 18, a further peripheral groove 50 is provided which encompasses the cover-side sealing face 38, receding opposite the latter, and which has a smaller radial width compared to the external diameter of the external cover section 18, and which is surrounded by a lip 52 of the external cover section 18 which extends backwards. By means of this peripheral groove, which expediently has a semicircular cross-section as in the sample embodiment, to prevent notch stressing, a narrow circular area 54 is produced in the external cover section 18 which encompasses the circular area of the cover-side sealing face 38 and the thickness of which compared to the area of the permanent sealing face 38 is decreased and which can thus accommodate distortions produced by the handle 40, without these impairing the shape constancy of the permanent sealing face 38. The external cover section 18 is reinforced by the lip 52, so that on the other hand the rest of the rim area of the external cover section 18 which projects beyond the narrow circular area 54 will also not be subjected to any severe deformations and in particular twisting. The lip 52 can, as in the sample embodiment, extend backwards to the plane of the cover-side sealing face 38. To increase the stiffening effect, it is also possible to make the lip 52 extend backwards even further, e.g. to the plane of the back of the sealing ring 46 facing the permanent sealing face 16.

The legs 42 of the stirrup 40 which essentially forms the handle 20 expediently meet the external cover section 18 at least basically at right angles, and in the sample embodiment precisely at right angles. As a result of this, if the legs 42 are bent, essentially only the narrow circular area 54 adjacent to the peripheral groove 50 will be deformed by bending, whereas for example, if the legs 42 ran obliquely to the external cover section 18, a larger cross-sectional area of the external cover 18 would affected by the deformations, as a result of which these could also spread to the cover-side sealing face 38, provided that a greater external diameter of the external cover section 18 has not been selected, which would entail a greater material expenditure and is often inadmissible for space reasons. In addition, the run of the legs 42 at right angles to the external cover section 18 is also ergonomically favourable, since as a result the handle 20 can be gripped far out at the transition between the legs 42 and the middle section 44.

Figure 2:
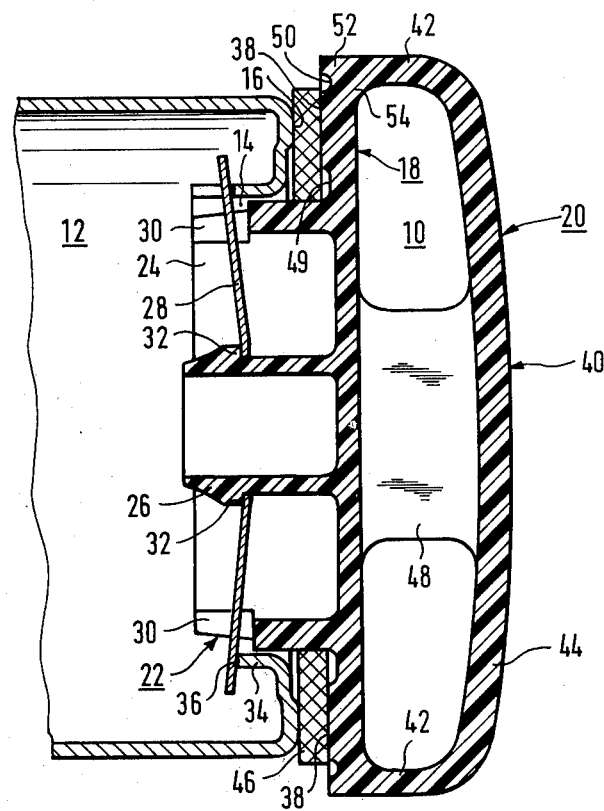
FIG. 2 shows a longitudinal section through the sealing cap, along the line II—II in FIG. 1.

As can be recognised from a comparison of FIG. 1 and FIG. 2, the stirrup 40 has an approximately rectangular or oval cross-section with a width expediently 3 to 4 times larger than its thickness; in the sample embodiment, the width in the area of the legs 42 is approximately 3.2 times the greatest thickness. The wide sides of the cross-section lie in the region of the legs 42 approximately tangentially to the periphery of the external cover section 18, and in the region of the middle section 44 of the stirrup 40 parallel to the external cover section 18. As a result of this, the external dimensions of the stirrup 20 and consequently the external diameter of the external cover section 18 only require to be selected very slightly larger than the external diameter of the cover-side sealing face 38, to achieve nevertheless that the internal spacing of the legs 42 is at least as large as the external diameter of the cover-side sealing face 38. The latter condition is thus satisfied with slight material expenditure and a small overall size. The small overall size, already referred to above in connection with other measures, is of particular importance in many applications, e.g. for the restricted space conditions in motor vehicles, and especially in their engine compartment.

As a result of the cross-sectional shape of the stirrup 44 discussed, the latter is on the other hand sensitive to axial forces acting on its middle section, since it can easily be deflected towards the external cover section 18 or by it, which results in swivelling of the legs 42 about their attachment points on the external cover section 18. Although such swivelling motions can, as explained above, be accommodated by means of the peripheral groove 50 provided and the adjacent narrow circular area 54, fairly large deformations of this nature could nevertheless result in impairment of the shape constancy of the cover-side sealing face 38, for which reason it is expedient to avoid the deflections mentioned. The deflections will be counteracted already by the fact that the middle section 44 of the stirrup 40 has a slightly curved shape from the external cover section 18 onwards and changes into the legs 42 rounded, as a result of which the curve formed is relatively form rigid. This measure is also expedient for reasons still to be discussed. As a further and particularly effective means of preventing deflections of the middle section 44, provision is however made in the sample embodiment for the handle 20 to have a stay connecting the middle section 44 of the stirrup 40 with the area of the outside of the external cover section 18 located within the cover-side sealing face 38. By this means middle section 44 and external cover section 18 are kept at a fixed distance apart, as a result of which deflections of the middle section 44 can only take place during a simultaneous deflection of the internal area of the external cover section 18, and are consequently largely impossible.

In the sample embodiment, the stay quoted is formed as an approximately rectangular wall 48 in the side elevation of FIG. 2, located on the outside of the cap 10 in the plan view and underneath the centre line of the middle section 44 of the stirrup 40 in the side elevation according to FIG. 1, the length of which, measured in the longitudinal direction of the stirrup 40 is smaller than the internal diameter of the cover-side sealing face 38. Since the forces which have to be accommodated by the wall 48, which also subject it to a buckling stress, are not all that great, the thickness of the wall 48 can, as in the sample embodiment, expediently be selected as smaller than the width of the stirrup 40. This is also advantageous from the ergonomic aspect, because thus the stirrup 40, also in its section connected to the wall 48, remains as a bracket which can be gripped from behind, and the wall 48 even permits an especially safe gripping of the stirrup 44 because it prevents a slipping through of the finger-tips under the stirrup 40. These advantageous effects are still further reinforced by the fact that the width of the middle section 44 of the stirrup 40, in its section on which it is connected to the wall 48, is greater by approximately the thickness of this wall 48 than the width of the legs 42, and that the width of the middle section 44 decreases continuously from this section towards the legs 42; the greatest width of the middle section 44, compared to the width of the legs 42 can be clearly seen in FIG. 1. On the other hand, as is evident from FIG. 2, the length of the wall 48, measured in the longitudinal direction of the stirrup 40, is greater than its height located between the stirrup 40 and the outside of the external cover section 18, and also greater than half the internal diameter of the cover-side sealing face 38. By means of this relatively long length, the forces acting from the middle section 44 of the stirrup 40 onwards, subjecting the wall 48 to buckling stress, can be particularly well accommodated, as a result of which the desired small thickness of the wall 48 can be demanded in return.

Not only in the area of the peripheral groove 48, but in its entire central area located within the circular area of the cover-side sealing face 38, the external cover section 18 exhibits a smaller thickness than in the area of the cover-side sealing face 38. As a result, any deformations of the external cover section 18, such as can be transmitted e.g. by the middle section 44 of the stirrup 40 via the wall 48, will remain restricted to the middle section of the external cover section 18, without significantly affecting the shape constancy of the cover-side sealing face 38. The relatively small thickness of the middle section of the external cover section 18 also has the effect that, when the sealing cap 10 is done up firmly, the large tension forces stemming from the twisting seal, which the plug 26 exerts on the external cover section 18, are not only accommodated by the latter, but also by the stirrup 44 through the stay. In this connection too, the bow shape of the stirrup 44 is advantageous for the accommodation of the forces quoted.

Other designs of the invention, which are not described and which differ from the sample embodiment shown, are of course possible. For instance, in place of the twisting seal, other sealing methods provided at the internal section 22 can be used which work together with other suitable sealing means on the opening-side, in particular an external thread and an internal thread.

I claim:

1. In a sealing cap, for a container or a pipe having means defining an opening surrounded by a circular sealing face and tightening means to cooperate with the cap, the cap including:
   (a) an external cover section adapted to cover said opening and the circular sealing face and having an external diameter which is greater than the external diameter of the circular sealing face, and includng a circular sealing face facing the sealing face of the container or pipe;
   (b) an internal cover section projecting from the external cover section into the opening, the internal cover section including tightening means to cooperate with the tightening means of the container or pipe;
   (c) a handle molded in one piece on the external cover section and extending diametrically across the external cover section at the outer face thereof, said handle including a U-shaped stirrup having two legs by the ends of which it is connected to the external cover section, said handle further including a wall extending along a center line of the stirrup and connecting the stirrup to the external cover section; the improvement that:
      (i) the external cover section and the internal cover section are made in one piece of plastic material
      (ii) the legs of the solid material stirrup have an internal spacing from each other which is not less than the external diameter of the circular sealing face of the cover section
      (iii) the length of the wall connecting the stirrup to the external cover section, measured in the longitudinal direction of the stirrup, is less than the internal diameter of the circular sealing face of the cover.

2. A sealing cap, as claimed in claim 1, wherein the legs of the stirrup meet the external cover section at least approximately at right angles.

3. A sealing cap, as claimed in claim 1, wherein the greater sides of the stirrup, in the region of the legs, lie approximately tangentially to the periphery of the external cover section and, in the region of the center section of the stirrup, lie parallel to the external cover section, the stirrup having an approximately rectangular cross-section the width of which is several times greater than its thickness.

4. A sealing cap, as claimed in claim 1, wherein the width of the stirrup, at its part at which it is connected to the wall which joins it to the external cover section, is greater than the width of the legs by approximately the thickness of said wall, said width decreasing continuously starting from said part and going towards the legs.

* * * * *